United States Patent
Cui et al.

(10) Patent No.: US 11,943,702 B2
(45) Date of Patent: Mar. 26, 2024

(54) DETERMINING REFERENCE CELL AVAILABILITY

(71) Applicant: APPLE INC., Cupertino, CA (US)

(72) Inventors: Jie Cui, Cupertino, CA (US); Qiming Li, Beijing (CN); Yang Tang, Cupertino, CA (US); Manasa Raghavan, Cupertino, CA (US); Xiang Chen, Cupertino, CA (US); Huaning Niu, Cupertino, CA (US); Dawei Zhang, Cupertino, CA (US); Hong He, Cupertino, CA (US); Haitong Sun, Cupertino, CA (US); Yushu Zhang, Beijing (CN)

(73) Assignee: APPLE INC., Cupertino, CA (US)

(*) Notice: Subject to any disclaimer, the term of this patent is extended or adjusted under 35 U.S.C. 154(b) by 340 days.

(21) Appl. No.: 17/593,191

(22) PCT Filed: Jan. 15, 2021

(86) PCT No.: PCT/CN2021/072281
§ 371 (c)(1),
(2) Date: Sep. 10, 2021

(87) PCT Pub. No.: WO2022/151403
PCT Pub. Date: Jul. 21, 2022

(65) Prior Publication Data
US 2023/0180107 A1 Jun. 8, 2023

(51) Int. Cl.
*H04W 48/16* (2009.01)
*H04W 76/28* (2018.01)

(52) U.S. Cl.
CPC ............ *H04W 48/16* (2013.01); *H04W 76/28* (2018.02)

(58) Field of Classification Search
CPC .............................. H04W 48/16; H04W 76/28
See application file for complete search history.

(56) References Cited

U.S. PATENT DOCUMENTS

2010/0296410 A1* 11/2010 Kazmi .................. H04W 24/10
370/252
2018/0176810 A1 6/2018 Thangarasa et al.

FOREIGN PATENT DOCUMENTS

CN 104126321 A 10/2014

OTHER PUBLICATIONS

3GPP TS 38.213, "3rd Generation Partnership Project; Technical Specification Group Radio Access Network; NR; Physical layer procedures for control (Release 16)", V16.2.0, Jun. 30, 2020.
PCT/CN2021/072281, International Search Report and Written Opinion, dated Oct. 12, 2021, 9 pages.

* cited by examiner

*Primary Examiner* — Diane D Mizrahi
(74) *Attorney, Agent, or Firm* — Dorsey & Whitney LLP

(57) ABSTRACT

Provided is a method for a user equipment (UE). The method comprises determining a first time period for the UE, based on whether the UE uses Discontinuous Reception (DRX) and whether the UE uses Measurement Gap (MG). The first time period indicates a respective timing criterion for the UE to determine a time period of maintaining available downlink timing for a reference cell; The method further comprises determining, based on the first time period, a first time threshold for the UE to determine reference cell availability.

20 Claims, 7 Drawing Sheets

DETERMINING REFERENCE CELL AVAILABILITY

TECHNICAL FIELD

This application relates generally to wireless communication systems, and more specifically to the user equipment (UE) reference timing in New Radio-Unlicensed (NR-U).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) is provided. The method may comprise determining a first time period for the UE, based on whether the UE uses Discontinuous Reception (DRX) and whether the UE uses Measurement Gap (MG); and determining, based on the first time period, a first time threshold for the UE to determine reference cell availability. The first time period may indicate a respective timing criterion for the UE to determine a time period of maintaining available downlink timing for a reference cell.

According to an aspect of the present disclosure, an apparatus for a user equipment (UE) is provided that comprises one or more processors configured to perform steps of the method as describe above.

According to an aspect of the present disclosure, a computer readable medium having computer programs stored thereon is provided, which, when executed by one or more processors, cause an apparatus to perform steps of the method as describe above.

According to an aspect of the present disclosure, an apparatus for a communication device is provided that comprises means for performing steps of the method as describe above.

According to an aspect of the present disclosure, a computer program product comprising computer programs which, when executed by one or more processors, cause an apparatus to perform steps of the method as describe above.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In wireless communication systems, if the UE uses a reference cell on a earlier frequency subject to Clear Channel Assessment (CCA) for deriving the UE transmit timing, then the UE shall meet the requirement for an initial transmission provided that at least one (Synchronization Signal Block) SSB is available at the UE during the last 160 ms.

The UE shall determine the reference cell (or, reference timing) availability first and then the above UE behavior could be applied based on the availability of reference cell (or, reference timing). For serving cell(s) in Primary Timing Advance Group (pTAG), UE shall use the Special Cell (SpCell) as the reference cell for deriving the UE transmit timing for cells in the pTAG. If a reference cell on a carrier frequency belonging to the pTAG, which is subject to CCA, is unavailable at the UE for more than 160 ms then the UE is allowed to use any of available activated Secondary Cell(s) (SCell(s)) at the UE in pTAG as a new reference cell. If the SCell used as reference cell is deactivated, or becomes unavailable for more than 160 ms, the UE is allowed to use another active serving cell in pTAG as new reference cell. For serving cell(s) in Secondary Timing Advance Group (sTAG), UE shall use any of the activated SCell(s) as the reference cell for deriving the UE transmit timing for the cells in the sTAG. If a reference cell on a carrier frequency belonging to the sTAG, which is subject to CCA is unavailable at the UE for more than 160 ms then the UE is allowed to use any of available activated SCell(s) at the UE in sTAG as a new reference cell.

Figure 1:
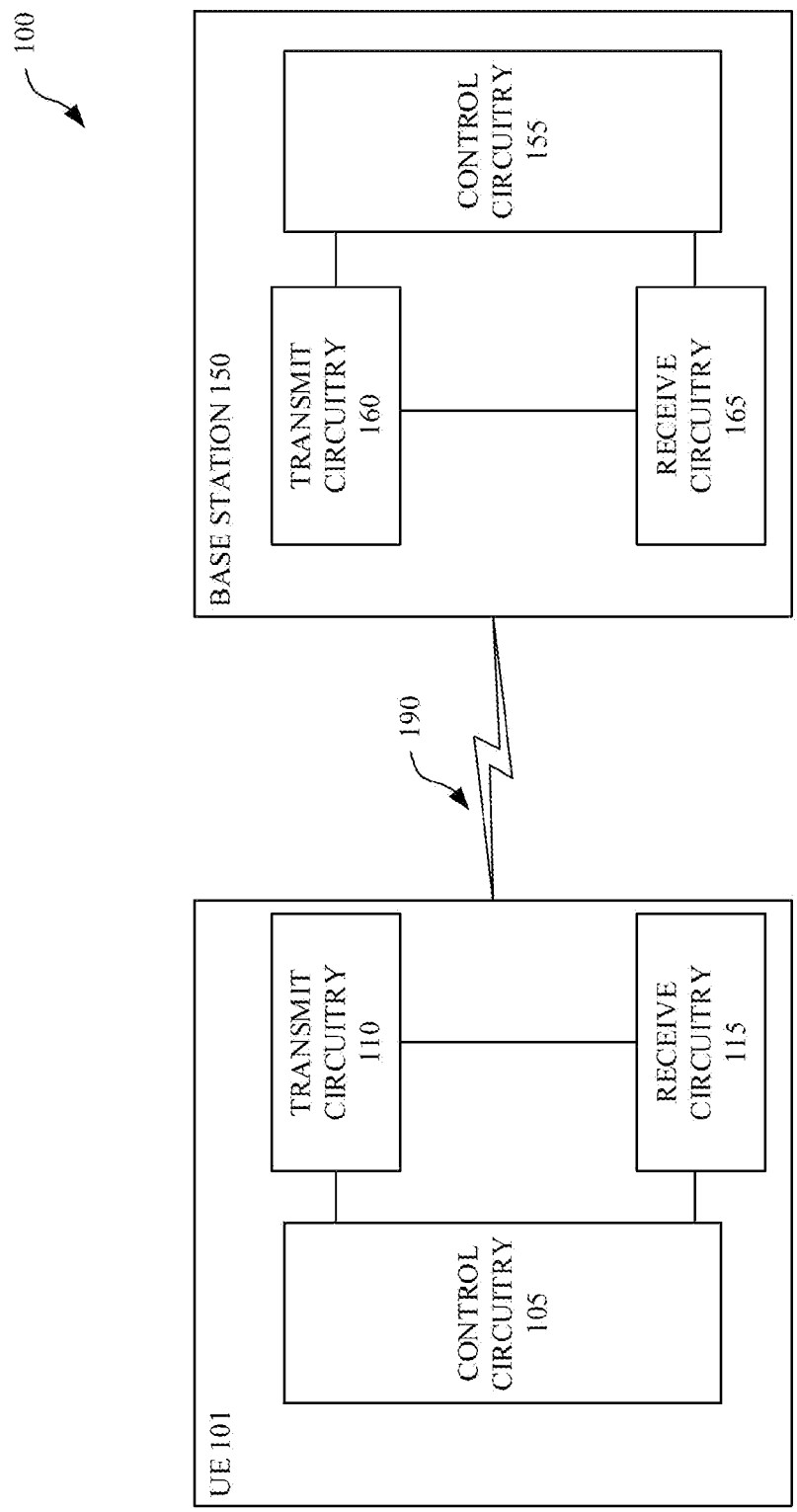
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beam-forming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuity 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink sub-frames.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

Figure 2:
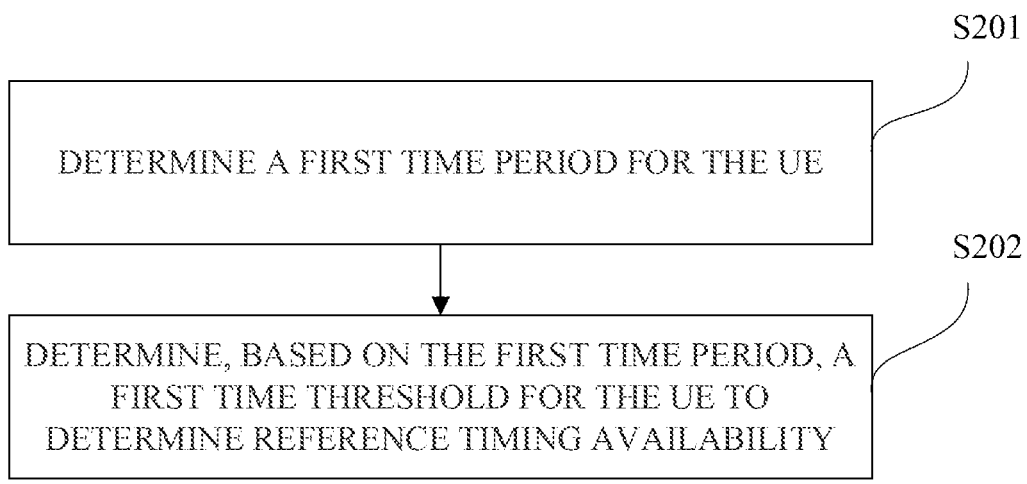
FIG. 2 illustrates a flowchart for an exemplary method for a user equipment (UE) in accordance with some embodiments.

FIG. 2 illustrates a flowchart for an exemplary method for a user equipment in accordance with some embodiments. The method 200 illustrated in FIG. 2 may be implemented by the UE 101 described in FIG. 1.

The method 200 may begin at step S201, where the UE may determine a first time period for the UE, based on whether the UE uses Discontinuous Reception (DRX) and whether the UE uses Measurement Gap (MG). The first time period indicates a respective timing criterion for the UE to determine a time period of maintaining available downlink timing for a reference cell. In some embodiments, the first time period may relate to a sampling rate at the physical layer, in other words, the first time period may be based on the physical layer measurement time interval for the reference cell.

At step S202, the UE may determine, based on the first time period, a first time threshold for the UE to determine reference cell availability.

The reference cell availability is determined by above two steps taking into account timing criteria for UE to determine DL timing availability. The availability criteria for UE are determined and then the UE behavior could be applied based on the availability of reference.

In some embodiments, the UE may do not use DRX. The first time period is determined based on a synchronization signal and physical broadcast channel block (SSB)-based measurement timing configuration (SMTC) periodicity of the UE.

In some embodiments, the UE do not use DRX and does not use MG, for instance, the reference cell SSB is inside active Bandwidth Part (BWP) and the reference cell SSB time tracking can be performed without MG. The first time period is determined as a product of a first factor and the SMTC periodicity.

Figure 3:
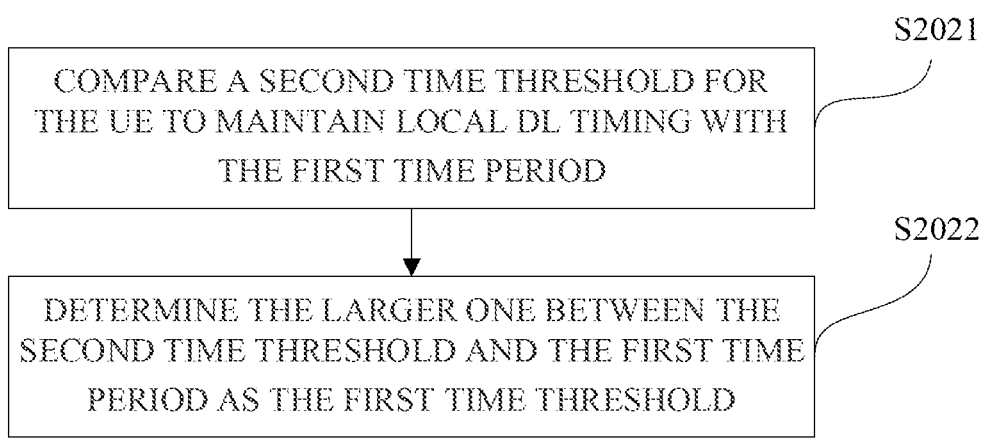
FIG. 3 illustrates a flowchart for an exemplary method for a user equipment (UE) in accordance with some embodiments.

As shown in FIG. 3, the step S202, determining, based on the first time period, a first time threshold for the UE to determine reference cell availability comprises: step S2021, comparing a second time threshold for the UE to maintain local DL timing with the first time period; step S2022, determining the larger one between the second time threshold and the first time period as the first time threshold.

In some embodiments, the first factor may have a predefined value which is greater than or equal to 1. For example, when the second time threshold is defined as 160 ms, the first time threshold may be determined by:

$$X=\max\{M_1\times\text{SMTC periodicity}, 160\text{ ms}\}, M_1\geq 1$$

Wherein X and $M_1$ are the first time threshold and the first factor, respectively.

In some embodiments, the first factor may be a measurement resource sharing factor. In some embodiments, the measurement resource sharing factor may be a carrier-specific scaling factor CSSF defined in the section 9.1.5.1 of 3GPP TS 38.133 V16.6.0. For example, when the second time threshold is defined as 160 ms, and the first time threshold may be determined by:

$$X=\max\{\text{SMTC periodicity}\times\text{CSSF}_{intra}, 160\text{ ms}\}$$

Wherein, X and $\text{CSSF}_{intra}$ are the first time threshold and carrier-specific scaling factor CSSF defined in the section 9.1.5.1 of 3GPP TS 38.133 V16.6.0, respectively.

In some embodiments, the first factor may be a product of a second factor and a measurement resource sharing factor. The second factor is based on how intra-frequency SMTC is overlapped with MGs; in other word, the second factor is based on MG overlapping condition. In some embodiments, the measurement resource sharing factor is a carrier-specific scaling factor CSSF defined in the section 9.1.5.1 of 3GPP TS 38.133 V16.6.0. For example, when the second time threshold is defined as 160 ms, the first time threshold may be determined by:

$$X=\max\{(K_p \text{ or ceiling }(K_p))\times\text{SMTC periodicity}\times\text{CSSF}_{intra}, 160\text{ ms}\}$$

Wherein X, and $\text{CSSF}_{intra}$ are the first time threshold and the carrier-specific scaling factor CSSF defined in the section 9.1.5.1 of 3GPP TS 38.133 V16.6.0, respectively. In some embodiments, the second factor may be $K_p$. In other embodiments, the second factor may be ceiling ($K_p$). Even though the UE does not use MGs, the second factor may be determined based on MGs since there are always MGs which are configured by the base station no matter whether the UE use them or not. When intra-frequency SMTC is fully non overlapping with MGs or intra-frequency SMTC is fully overlapping with MGs, $K_p=1$. When intra-frequency SMTC is partially overlapping with MGs, $K_p=1/(1-(\text{SMTC periodicity/MGRP}))$, where SMTC period<MGRP and MGRP means a measurement gap repetition periodicity. $K_p$ is as defined in section 9.2A.5.1 in TS 38.133 V16.6.0.

UE determines the reference cell or reference timing on a carrier frequency subject to CCA is not available at the UE refers to when at least one SSB is configured by gNB, but the first two successive candidate SSB positions for the same SSB index within the discovery burst transmission window are not available at the UE due to DL CCA failures at gNB during the last X otherwise the reference cell or reference timing on the carrier frequency subject to CCA is considered as available at the UE.

When the UE do not use DRX, in some embodiments where the UE uses MG, the reference cell SSB is outside active BWP and the reference cell SSB time tracking needs MG. The first time period is determined based on the larger one between the SMTC periodicity and a measurement gap repetition (MGRP).

In some embodiments, the first time threshold is determined as a product of a third factor and the larger one between the SMTC periodicity and the MGRP, the third factor having a predefined value which is greater than or equal to 1. For example, the first time threshold may be determined by:

$$X=N_3\times\max\{\text{MGRP, SMTC periodicity}\}, N_3\geq 1$$

Wherein X and $N_3$ are the first time threshold and the third factor, respectively.

In some embodiments, the first time period is determined as a product of a fourth factor and the larger one between the SMTC periodicity and the MGRP, the fourth factor having a predefined value which is greater than or equal to 1.

Again, as shown in FIG. 3, the step S202, determining, based on the first time period, a first time threshold for the UE to determine reference cell availability comprises: step S2021, comparing a second time threshold for the UE to maintain local DL timing with the first time period; step S2022, determining the larger one between the second time threshold and the first time period as the first time threshold.

For example, when the second time threshold is defined as 160 ms, the first time threshold may be determined by:

$$X=\max\{M_4\times\max\{\text{MGRP, SMTC periodicity}\}, 160\text{ ms}\}, M_4\geq 1$$

Wherein X and $M_4$ are the first time threshold and the fourth factor, respectively.

In some embodiments, the first time period is determined as a product of a measurement resource sharing factor and the larger one between the SMTC periodicity and the MGRP.

Again, as shown in FIG. 3, the step S202, determining, based on the first time period, a first time threshold for the UE to determine reference cell availability comprises: step S2021, comparing a second time threshold for the UE to maintain local DL timing with the first time period; step S2022, determining the larger one between the second time threshold and the first time period as the first time threshold.

In some embodiments, the measurement resource sharing factor is a carrier-specific scaling factor CSSF defined in the section 9.1.5.2 of 3GPP TS 38.133 V16.6.0. For example, when the second time threshold is defined as 160 ms, and the first time threshold may be determined by:

$$X=\max\{\max\{\text{MGRP, SMTC periodicity}\}\times\text{CSSF}_{intra}, 160\text{ ms}\}$$

Wherein X and $\text{CSSF}_{intra}$ are the first time threshold and carrier-specific scaling factor CSSF defined in the section 9.1.5.2 of 3GPP TS 38.133 V16.6.0., respectively.

In some embodiments, the first time threshold is determined as a predefined fixed value larger than or equal to the second time threshold such as 160 ms.

UE determines the reference cell or reference timing on a carrier frequency subject to CCA is not available at the UE refers to when at least one SSB is configured by gNB, but the first two successive candidate SSB positions for the same SSB index within the discovery burst transmission window are not available at the UE due to DL CCA failures at gNB during the last X ms; otherwise the reference cell or reference timing on the carrier frequency subject to CCA is considered as available at the UE.

In some embodiments, the UE may use DRX but does not use MG, where the reference cell SSB is inside active BWP and the reference cell SSB time tracking can be performed without MG. The first time period is determined based on a synchronization signal and physical broadcast channel block (SSB)-based measurement timing configuration (SMTC) periodicity and a DRX cycle of the UE.

In some embodiments, the first time threshold is determined as a product of a fifth factor and the larger one between the SMTC periodicity and the DRX cycle, the fifth factor having a predefined value which is greater than or equal to 1. For example, the first time threshold may be determined by:

$$X = N_5 \times \max\{\text{SMTC periodicity, DRX cycle}\}, N_5 \geq 1$$

Wherein X and $N_5$ are the first time threshold and the fifth factor, respectively.

In some embodiments, wherein the first time period is determined as a product of a sixth factor and the larger one between the SMTC periodicity and the DRX cycle, the sixth factor having a predefined value which is greater than or equal to 1.

Again, as shown in FIG. 3, the step S202, determining, based on the first time period, a first time threshold for the UE to determine reference cell availability comprises: step S2021, comparing a second time threshold for the UE to maintain local DL timing with the first time period; step S2022, determining the larger one between the second time threshold and the first time period as the first time threshold.

For example, when the second time threshold is defined as 160 ms, the first time threshold may be determined by:

$$X = \max\{M_6 \times \max\{\text{SMTC periodicity, DRX cycle}\}, 160 \text{ ms}\}, M_6 \geq 1$$

Wherein X and $M_6$ are the first time threshold and the sixth factor, respectively.

When the UE uses DRX but does not use MG, in some embodiments where the DRX cycle may be greater than a third time threshold, the first time threshold is determined as a product of a measurement resource sharing factor and the DRX cycle. In some embodiments, the measurement resource sharing factor may be a carrier-specific scaling factor CSSF defined in the section 9.1.5.1 of 3GPP TS 38.133 V16.6.0. For example, when the third time threshold is defined as 320 ms, the first time threshold may be determined by:

$$X = \text{DRX cycle} \times \text{CSSF}_{intra}, \text{DRX cycle} > 320 \text{ ms}$$

Wherein X is the first time threshold and $\text{CSSF}_{intra}$ is the carrier-specific scaling factor CSSF defined in the section 9.1.5.1 of 3GPP TS 38.133 V16.6.0.

When the UE uses DRX but does not use MG, in some embodiments where the DRX cycle may be not greater than the third time threshold, the first time period is determined as a product of the following: a seventh factor, a measurement resource sharing factor and the larger one between the SMTC periodicity and the DRX cycle, the seventh factor being greater than or equal to 1.

Again, as shown in FIG. 3, the step S202, determining, based on the first time period, a first time threshold for the UE to determine reference cell availability comprises: step S2021, comparing a second time threshold for the UE to maintain local DL timing with the first time period; step S2022, determining the larger one between the second time threshold and the first time period as the first time threshold.

In some embodiments, the measurement resource sharing factor is a carrier-specific scaling factor CSSF defined in the section 9.1.5.1 of 3GPP TS 38.133 V16.6.0. For example, when the second time threshold is defined as 160 ms and the third time threshold is defined as 320 ms, the first time threshold may be determined by:

$$X = \max\{\max\{\text{SMTC periodicity, DRX cycle}\} \times \text{CSSF}_{intra}, 160 \text{ ms}\}, \text{DRX cycle} \leq 320 \text{ ms}$$

Wherein X and $\text{CSSF}_{intra}$ are the first time threshold and carrier-specific scaling factor CSSF defined in the section 9.1.5.1 of 3GPP TS 38.133 V16.6.0, respectively. The seventh factor is equal to 1.

For example, when the second time threshold is defined as 160 ms and the third time threshold is defined as 320 ms, the first time threshold may be determined by:

$$X = \max\{(1.5 \text{ or } 2) \times \max\{\text{SMTC periodicity, DRX cycle}\} \times \text{CSSF}_{intra}, 160 \text{ ms}\}, \text{DRX cycle} \leq 320 \text{ ms}$$

Wherein X and $\text{CSSF}_{intra}$ are the first time threshold and carrier-specific scaling factor CSSF defined in the section 9.1.5.1 of 3GPP TS 38.133 V16.6.0, respectively. The seventh factor is equal to 1.5 or 2.

When the UE uses DRX but does not use MG, in some embodiments where the DRX cycle is greater than a third time threshold, the first time threshold is determined as a product of the following: an eighth factor, a measurement resource sharing actor and the DRX cycle, wherein the eighth factor is based on how intra-frequency SMTC is overlapped with MGs.

In some embodiments, the measurement resource sharing factor is a carrier-specific scaling factor CSSF defined in the section 9.1.5.1 of 3GPP TS 38.133 V16.6.0.

For example, when the third time threshold is defined as 320 ms, the first time threshold may be determined by:

$$X = (K_p \text{ or ceiling } (K_p)) \times \text{DRX cycle} \times \text{CSSF}_{intra}, \text{DRX cycle} > 320 \text{ ms}$$

Wherein X, and $\text{CSSF}_{intra}$ are the first time threshold and the carrier-specific scaling factor CSSF defined in the section 9.1.5.1 of 3GPP TS 38.133 V16.6.0, respectively. In some embodiments, the eighth factor may be $K_p$. In other embodiments, the eighth factor may be ceiling $(K_p)$.

When the UE uses DRX but does not use MG, in some embodiments where the DRX cycle may be not greater than a third time threshold, the first time period is determined as a product of the following: a ninth factor, a measurement resource sharing factor, the larger one between the SMTC periodicity and the DRX cycle, and wherein the ninth factor based on how intra-frequency SMTC is overlapped with MGs.

Again, as shown in FIG. 3, the step S202, determining, based on the first time period, a first time threshold for the UE to determine reference cell availability comprises: step S2021, comparing a second time threshold for the UE to maintain local DL timing with the first time period; step S2022, determining the larger one between the second time threshold and the first time period as the first time threshold.

In some embodiments, the ninth factor may be based on $K_p$. For example, the ninth factor may be equal to $K_p$ or ceiling$(K_p)$. In other embodiments, the ninth factor may be further based on a relaxation due to DRX mode. As a result, for instance, the ninth factor may be $(1.5 \times K_p)$ or ceiling $(1.5 \times K_p)$.

In some embodiments, the measurement resource sharing factor is a carrier-specific scaling factor CSSF defined in the section 9.1.5.1 of 3GPP TS 38.133 V16.6.0. For example, when the second time threshold is defined as 160 ms and the third time threshold is defined as 320 ms, the first time threshold may be determined by:

$X=\max\{(K_p \text{ or ceiling }(K_p))\times\max\{\text{SMTC periodicity, DRX cycle}\}\times\text{CSSF}_{intra}, 160 \text{ ms}\}$, DRX cycle≤320 ms Or $X=\max\{((1.5\times K_p) \text{ or ceiling }(1.5\times K_p))\times\max\{\text{SMTC periodicity, DRX cycle}\}\times\text{CSSF}_{intra}, 160 \text{ ms}\}$, DRX cycle≤320 ms Wherein X and $\text{CSSF}_{intra}$ are the first time threshold and carrier-specific scaling factor CSSF defined in the section 9.1.5.1 of 3GPP TS 38.133 V16.6.0, respectively.

Even though the UE does not use MGs, the ninth factor may be determined based on MGs since there are always MGs which are configured by the base station no matter whether the UE use them or not. When intra-frequency SMTC is fully non overlapping with MGs or intra-frequency SMTC is fully overlapping with MGs, $K_p=1$. When intra-frequency SMTC is partially overlapping with MGs, $K_p=1/(1-(\text{SMTC periodicity/MGRP}))$, where SMTC period<MGRP and MGRP means a measurement gap repetition. $K_p$ is as defined in section 9.2A.5.1 in TS 38.133 V16.6.0

In some embodiments, the first time threshold is determined as a predefined fixed value larger than or equal to the second time threshold such as 160 ms. In some embodiments, the predefined fixed values are different among different DRX cycles.

UE determine the reference cell or reference timing on a carrier frequency subject to CCA is not available at the UE refers to when at least one SSB is configured by gNB, but the first two successive candidate SSB positions for the same SSB index within the discovery burst transmission window are not available at the UE due to DL CCA failures at gNB during the last X ms; otherwise the reference cell or reference timing on the carrier frequency subject to CCA is considered as available at the UE.

In some embodiments, the UE may use DRX and MG, where the reference cell SSB is outside active BWP and the reference cell SSB time tracking needs MG. The first time period is determined based on a synchronization signal and physical broadcast channel block (SSB)-based measurement timing configuration (SMTC) periodicity, a DRX cycle and a measurement gap repetition (MGRP) of the UE.

In some embodiments, the first time threshold is determined as a product of a tenth factor and the largest one among the SMTC periodicity, the DRX cycle and the MGRP, the tenth factor having a predefined value which is greater than or equal to 1. For example, the first time threshold may be determined by:

$X=N_{10}\times\max\{\text{MGRP, SMTC periodicity, DRX cycle}\}, N_{10}\geq 1$

Wherein X and $N_{10}$ are the first time threshold and tenth factor, respectively.

In some embodiments, wherein the first time period is determined as a product of an eleventh factor and the largest one among the SMTC periodicity, the DRX cycle and the MGRP, the eleventh factor having a predefined value which is greater than or equal to 1.

Again, as shown in FIG. 3, the step S202, determining, based on the first time period, a first time threshold for the UE to determine reference cell availability comprises: step S2021, comparing a second time threshold for the UE to maintain local DL timing with the first time period; step S2022, determining the larger one between the second time threshold and the first time period as the first time threshold.

For example, when the second time threshold is defined as 160 ms, the first time threshold may be determined by:

$X=\max\{M_{11}\times\max\{\text{MGRP, SMTC periodicity, DRX cycle}\}, 160 \text{ ms}\}, M_{11}\geq 1$ Wherein, X and $M_{11}$ are the first time threshold and the eleventh factor, respectively.

When the UE uses DRX and MG, in some embodiments where the DRX cycle may be greater than a third time threshold, the first time threshold is determined as a product of the DRX cycle and a measurement resource sharing factor. In some embodiments, the measurement resource sharing factor is a carrier-specific scaling factor CSSF defined in the section 9.1.5.2 of 3GPP TS 38.133 V16.6.0. For example, when the third time threshold is defined as 320 ms, the first time threshold may be determined by:

$X=\text{DRX cycle}\times\text{CSSF}_{intra}$, DRX cycle>320 ms

Wherein X and $\text{CSSF}_{intra}$ are the first time threshold and carrier-specific scaling factor CSSF defined in the section 9.1.5.2 of 3GPP TS 38.133 V16.6.0, respectively.

When the UE uses DRX and MG, in some embodiments where the DRX cycle may be not greater than the third time threshold, the first time period is determined as a product of the following: a twelfth factor, a measurement resource sharing factor, the largest one among the SMTC periodicity, the DRX cycle and the MGRP, the twelfth factor having a predefined value which is greater than or equal to 1.

Again, as shown in FIG. 3, the step S202, determining, based on the first time period, a first time threshold for the UE to determine reference cell availability comprises: step S2021, comparing a second time threshold for the UE to maintain local DL timing with the first time period; step S2022, determining the larger one between the second time threshold and the first time period as the first time threshold.

In some embodiments, the measurement resource sharing factor is a carrier-specific scaling factor CSSF defined in the section 9.1.5.2 of 3GPP TS 38.133 V16.6.0.

For example, when the second time threshold is defined as 160 ms and the third time threshold is defined as 320 ms, the first time threshold may be determined by:

$X=\max\{\max\{\text{MGRP, SMTC periodicity, DRX cycle}\}\times\text{CSSF}_{intra}, 160 \text{ ms}\}$, DRX cycle≤320 ms Wherein X and $\text{CSSF}_{intra}$ are the first time threshold and carrier-specific scaling factor CSSF defined in the section 9.1.5.2 of 3GPP TS 38.133 V16.6.0, respectively. The twelfth factor is equal to 1.

For example, when the second time threshold is defined as 160 ms and the third time threshold is defined as 320 ms, the first time threshold may be determined by:

$X=\max\{(1.5 \text{ or } 2)\times\max\{\text{MGRP, SMTC periodicity, DRX cycle}\}\times\text{CSSF}_{intra}, 160 \text{ ms}\}$, DRX cycle≤320 ms Wherein X and $\text{CSSF}_{intra}$ are the first time threshold and carrier-specific scaling factor CSSF defined in the section 9.1.5.2 of 3GPP TS 38.133 V16.6.0., respectively. The twelfth factor is equal to 1.5 or 2.

In some embodiments, the first time threshold is determined as a predefined fixed value larger than or equal to the second time threshold such as 160 ms. In some embodiments, the predefined fixed values are different among different DRX cycles.

UE determine the reference cell or reference timing on a carrier frequency subject to CCA is not available at the UE refers to when at least one SSB is configured by gNB, but the first two successive candidate SSB positions for the same SSB index within the discovery burst transmission window are not available at the UE due to DL CCA failures at gNB during the last X ms; otherwise the reference cell or reference timing on the carrier frequency subject to CCA is considered as available at the UE.

Figure 4:
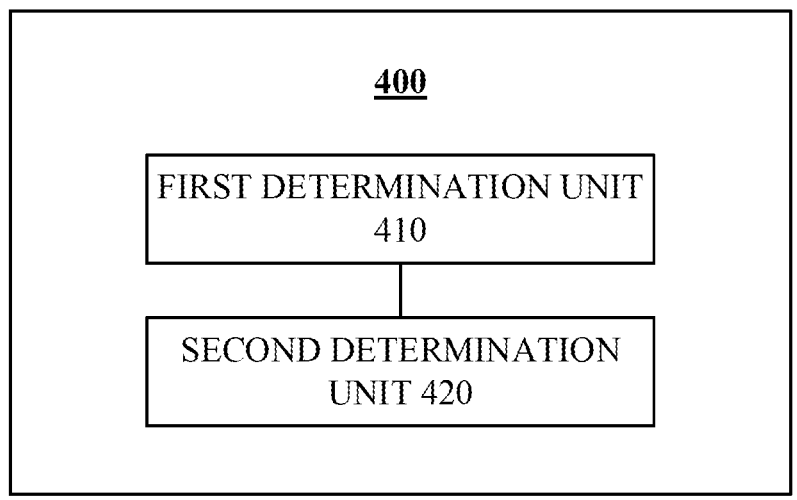
FIG. 4 illustrates an exemplary block diagram of an apparatus for a user equipment (UE) in accordance with some embodiments.

FIG. 4 illustrates an exemplary block diagram of an apparatus for a user equipment (UE) in accordance with some embodiments. The apparatus 400 illustrated in FIG. 4 may be used to implement the method 200 as illustrated in combination with FIG. 2

As illustrated in FIG. 4, the apparatus 400 includes a first determination unit 410 and a second determination unit 420.

The first determination unit 410 may be configured to determine a first time period for the UE, based on whether the UE uses Discontinuous Reception (DRX) and whether the UE uses Measurement Gap (MG), wherein the first time period indicates a respective timing criterion for the UE to determine a time period of maintaining available downlink timing for a reference cell. The second determination unit 420 may be configured to determining, based on the first time period, a first time threshold for the UE to determine reference cell availability.

According to the embodiments of the present application, by performing reference signal measurement in a relaxation mode based on the mobility of the UE, whether the reference cell or reference timing on a carrier frequency subject to CCA is available or not at the UE is determined, and then the UE behavior could be applied based on the availability of reference cell.

Figure 5:
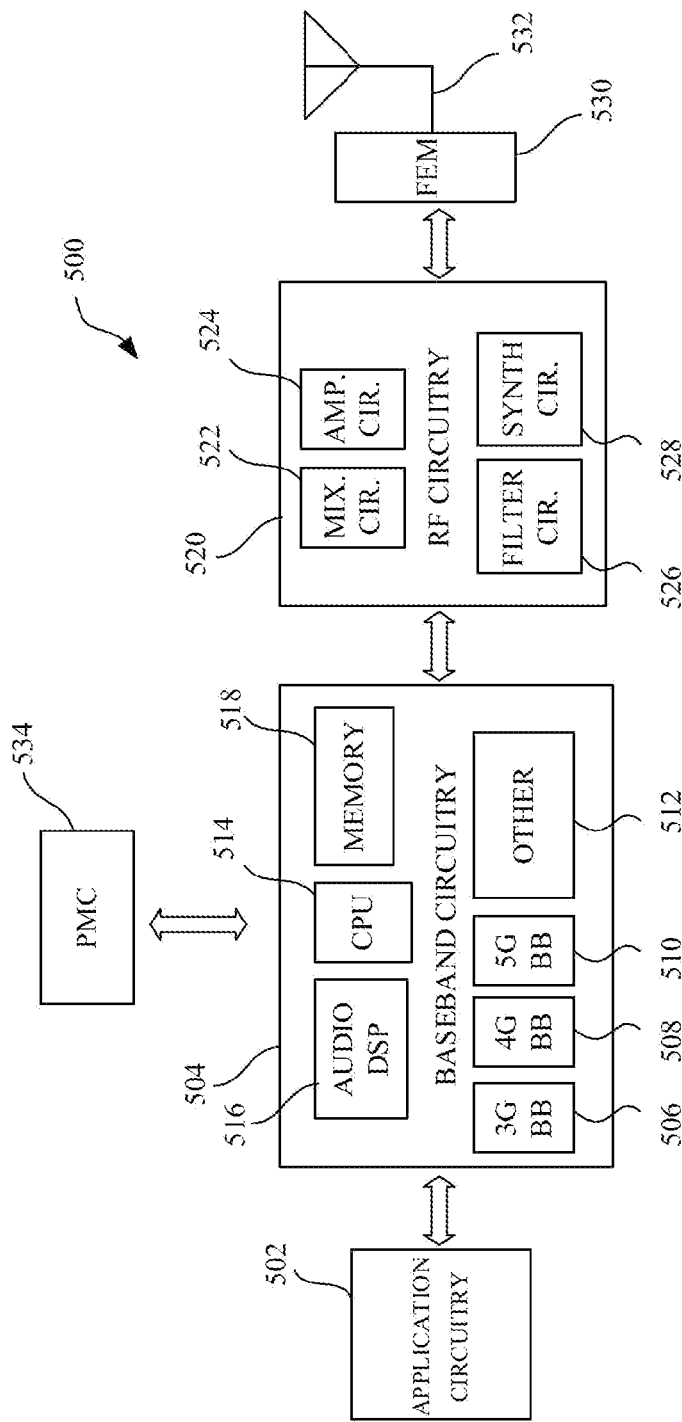
FIG. 5 illustrates example components of a device 500 in accordance with some embodiments.

FIG. 5 illustrates example components of a device 500 in accordance with some embodiments. In some embodiments, the device 500 may include application circuitry 502, baseband circuitry 504, Radio Frequency (RF) circuitry (shown as RF circuitry 520), front-end module (FEM) circuitry (shown as FEM circuitry 530), one or more antennas 532, and power management circuitry (PMC) (shown as PMC 534) coupled together at least as shown. The components of the illustrated device 500 may be included in a UE or a RAN node. In some embodiments, the device 500 may include fewer elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 520 and to generate baseband signals for a transmit signal path of the RF circuitry 520. The baseband circuitry 504 may interface with the application circuitry 502 for generation and processing of the baseband signals and for controlling operations of the RF circuitry 520. For example, in some embodiments, the baseband circuitry 504 may include a third generation (3G) baseband processor (3G baseband processor 506), a fourth generation (4G) baseband processor (4G baseband processor 508), a fifth generation (5G) baseband processor (5G baseband processor 510), or other baseband processor(s) 512 for other existing generations, generations in development or to be developed in the future (e.g., second generation (2G), sixth generation (6G), etc.). The baseband circuitry 504 (e.g., one or more of baseband processors) may handle various radio control functions that enable communication with one or more radio networks via the RF circuitry 520. In other embodiments, some or all of the functionality of the illustrated baseband processors may be included in modules stored in the memory 518 and executed via a Central Processing ETnit (CPET 514). The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include a digital signal processor (DSP), such as one or more audio DSP(s) 516. The one or more audio DSP(S) 516 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 504 is configured to support radio communications of more than one wireless protocol may be referred to as multi-mode baseband circuitry.

The RF circuitry 520 may enable communication with wireless networks using modulated electromagnetic radiation through a non-solid medium. In various embodiments, the RF circuitry 520 may include switches, filters, amplifiers, etc. to facilitate the communication with the wireless network. The RF circuitry 520 may include a receive signal path which may include circuitry to down-convert RF signals received from the FEM circuitry 530 and provide baseband signals to the baseband circuitry 504. The RF circuitry 520 may also include a transmit signal path which may include circuitry to up-convert baseband signals provided by the baseband circuitry 504 and provide RF output signals to the FEM circuitry 530 for transmission.

In some embodiments, the receive signal path of the RF circuitry 520 may include mixer circuitry 522, amplifier circuitry 524 and filter circuitry 526. In some embodiments, the transmit signal path of the RF circuitry 520 may include filter circuitry 526 and mixer circuitry 522. The RF circuitry 520 may also include synthesizer circuitry 528 for synthesizing a frequency for use by the mixer circuitry 522 of the receive signal path and the transmit signal path. In some embodiments, the mixer circuitry 522 of the receive signal path may be configured to down-convert RF signals received from the FEM circuitry 530 based on the synthesized frequency provided by synthesizer circuitry 528. The amplifier circuitry 524 may be configured to amplify the down-converted signals and the filter circuitry 526 may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, the mixer circuitry 522 of the receive signal path may comprise passive mixers, although the scope of the embodiments is not limited in this respect.

In some embodiments, the mixer circuitry 522 of the transmit signal path may be configured to up-convert input baseband signals based on the synthesized frequency provided by the synthesizer circuitry 528 to generate RF output signals for the FEM circuitry 530. The baseband signals may be provided by the baseband circuitry 504 and may be filtered by the filter circuitry 526.

In some embodiments, the mixer circuitry 522 of the receive signal path and the mixer circuitry 522 of the transmit signal path may include two or more mixers and may be arranged for quadrature downconversion and upconversion, respectively. In some embodiments, the mixer circuitry 522 of the receive signal path and the mixer circuitry 522 of the transmit signal path may include two or more mixers and may be arranged for image rejection (e.g., Hartley image rejection). In some embodiments, the mixer circuitry 522 of the receive signal path and the mixer circuitry 522 may be arranged for direct downconversion and direct upconversion, respectively. In some embodiments, the mixer circuitry 522 of the receive signal path and the mixer circuitry 522 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 520 may include analog-to-digital converter (ADC) and digital-to-analog converter (DAC) circuitry and the baseband circuitry 504 may include a digital baseband interface to communicate with the RF circuitry 520.

In some dual-mode embodiments, a separate radio IC circuitry may be provided for processing signals for each spectrum, although the scope of the embodiments is not limited in this respect.

In some embodiments, the synthesizer circuitry 528 may be a fractional-N synthesizer or a fractional N/N+1 synthesizer, although the scope of the embodiments is not limited in this respect as other types of frequency synthesizers may be suitable. For example, synthesizer circuitry 528 may be a delta-sigma synthesizer, a frequency multiplier, or a synthesizer comprising a phase-locked loop with a frequency divider.

The synthesizer circuitry 528 may be configured to synthesize an output frequency for use by the mixer circuitry 522 of the RF circuitry 520 based on a frequency input and a divider control input. In some embodiments, the synthesizer circuitry 528 may be a fractional N/N+1 synthesizer.

In some embodiments, frequency input may be provided by a voltage controlled oscillator (VCO), although that is not a requirement. Divider control input may be provided by either the baseband circuitry 504 or the application circuitry 502 (such as an applications processor) depending on the desired output frequency. In some embodiments, a divider control input (e.g., N) may be determined from a look-up table based on a channel indicated by the application circuitry 502.

Synthesizer circuitry 528 of the RF circuitry 520 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 528 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 520 may include an IQ/polar converter.

The FEM circuitry 530 may include a receive signal path which may include circuitry configured to operate on RF signals received from one or more antennas 532, amplify the received signals and provide the amplified versions of the received signals to the RF circuitry 520 for further processing. The FEM circuitry 530 may also include a transmit signal path which may include circuitry configured to amplify signals for transmission provided by the RF circuitry 520 for transmission by one or more of the one or more antennas 532. In various embodiments, the amplification through the transmit or receive signal paths may be done solely in the RF circuitry 520, solely in the FEM circuitry 530, or in both the RF circuitry 520 and the FEM circuitry 530.

In some embodiments, the FEM circuitry 530 may include a TX/RX switch to switch between transmit mode and receive mode operation. The FEM circuitry 530 may include a receive signal path and a transmit signal path. The receive signal path of the FEM circuitry 530 may include an LNA to amplify received RF signals and provide the amplified received RF signals as an output (e.g., to the RF circuitry 520). The transmit signal path of the FEM circuitry 530 may include a power amplifier (PA) to amplify input RF signals (e.g., provided by the RF circuitry 520), and one or more filters to generate RF signals for subsequent transmission (e.g., by one or more of the one or more antennas 532).

In some embodiments, the PMC 534 may manage power provided to the baseband circuitry 504. In particular, the PMC 534 may control power-source selection, voltage scaling, battery charging, or DC-to-DC conversion. The PMC 534 may often be included when the device 500 is capable of being powered by a battery, for example, when the device 500 is included in a EGE. The PMC 534 may increase the power conversion efficiency while providing desirable implementation size and heat dissipation characteristics.

FIG. 5 shows the PMC 534 coupled only with the baseband circuitry 504. However, in other embodiments, the PMC 534 may be additionally or alternatively coupled with, and perform similar power management operations for, other components such as, but not limited to, the application circuitry 502, the RF circuitry 520, or the FEM circuitry 530.

In some embodiments, the PMC 534 may control, or otherwise be part of, various power saving mechanisms of the device 500. For example, if the device 500 is in an RRC Connected state, where it is still connected to the RAN node as it expects to receive traffic shortly, then it may enter a state brown as Discontinuous Reception Mode (DRX) after a period of inactivity. During this state, the device 500 may power down for brief intervals of time and thus save power.

If there is no data traffic activity for an extended period of time, then the device 500 may transition off to an RRC Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
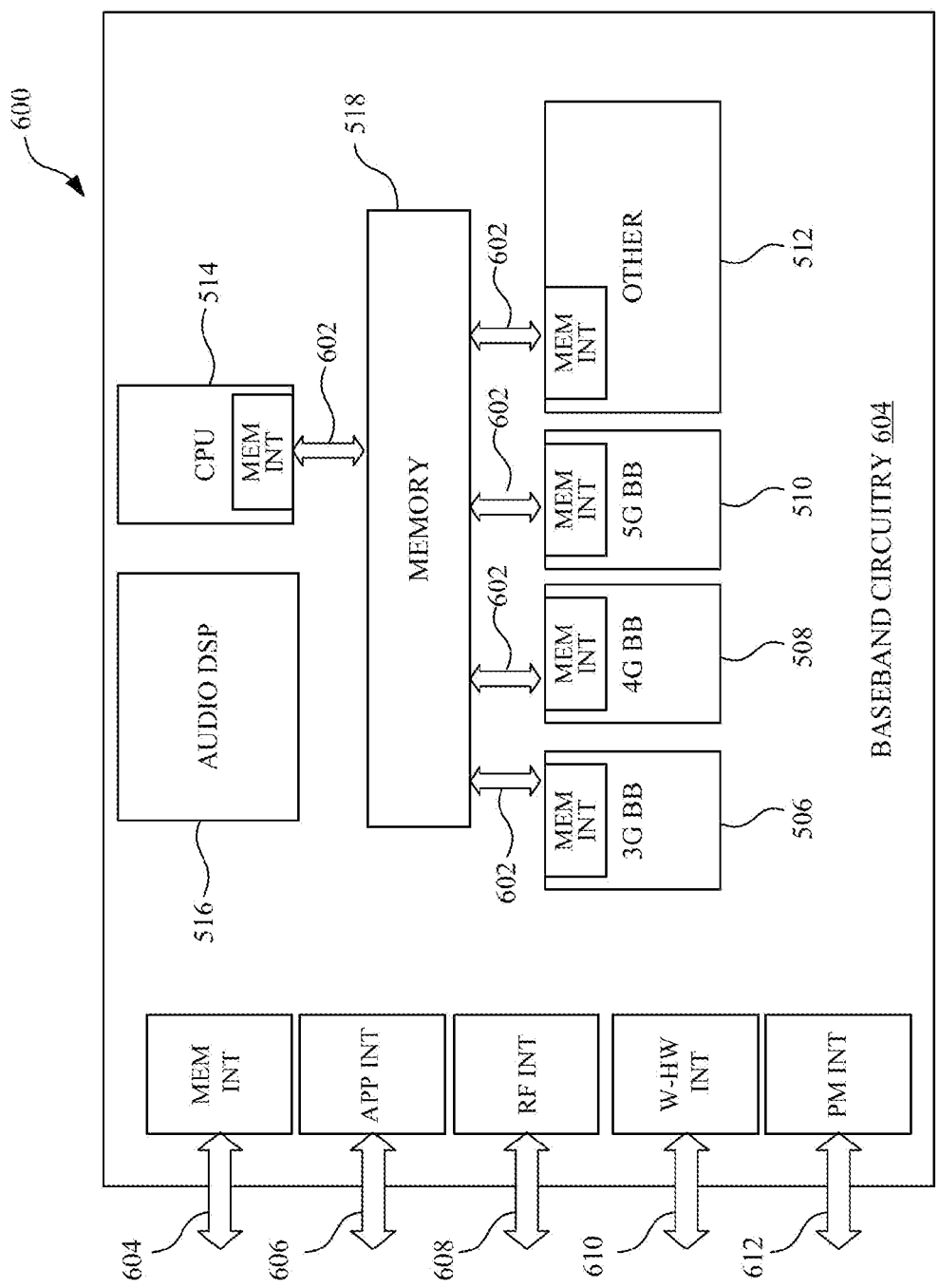
FIG. 6 illustrates example interfaces 600 of baseband circuitry in accordance with some embodiments.

FIG. 6 illustrates example interfaces 600 of baseband circuitry in accordance with some embodiments. As discussed above, the baseband circuitry 504 of FIG. 5 may comprise 3G baseband processor 506, 4G baseband processor 508, 5G baseband processor 510, other baseband processor(s) 512, CPU 514, and a memory 518 utilized by said processors. As illustrated, each of the processors may include a respective memory interface 602 to send/receive data to/from the memory 518.

The baseband circuitry 504 may further include one or more interfaces to communicatively couple to other circuitries/devices, such as a memory interface 604 (e.g., an interface to send/receive data to/from memory external to the baseband circuitry 504), an application circuitry interface 606 (e.g., an interface to send/receive data to/from the application circuitry 502 of FIG. 5), an RF circuitry interface 608 (e.g., an interface to send/receive data to/from RF circuitry 520 of FIG. 5), a wireless hardware connectivity interface 610 (e.g., an interface to send/receive data to/from Near Field Communication (NFC) components, Bluetooth® components (e.g., Bluetooth® Low Energy), Wi-Fi® components, and other communication components), and a power management interface 612 (e.g., an interface to send/receive power or control signals to/from the PMC 534.

Figure 7:
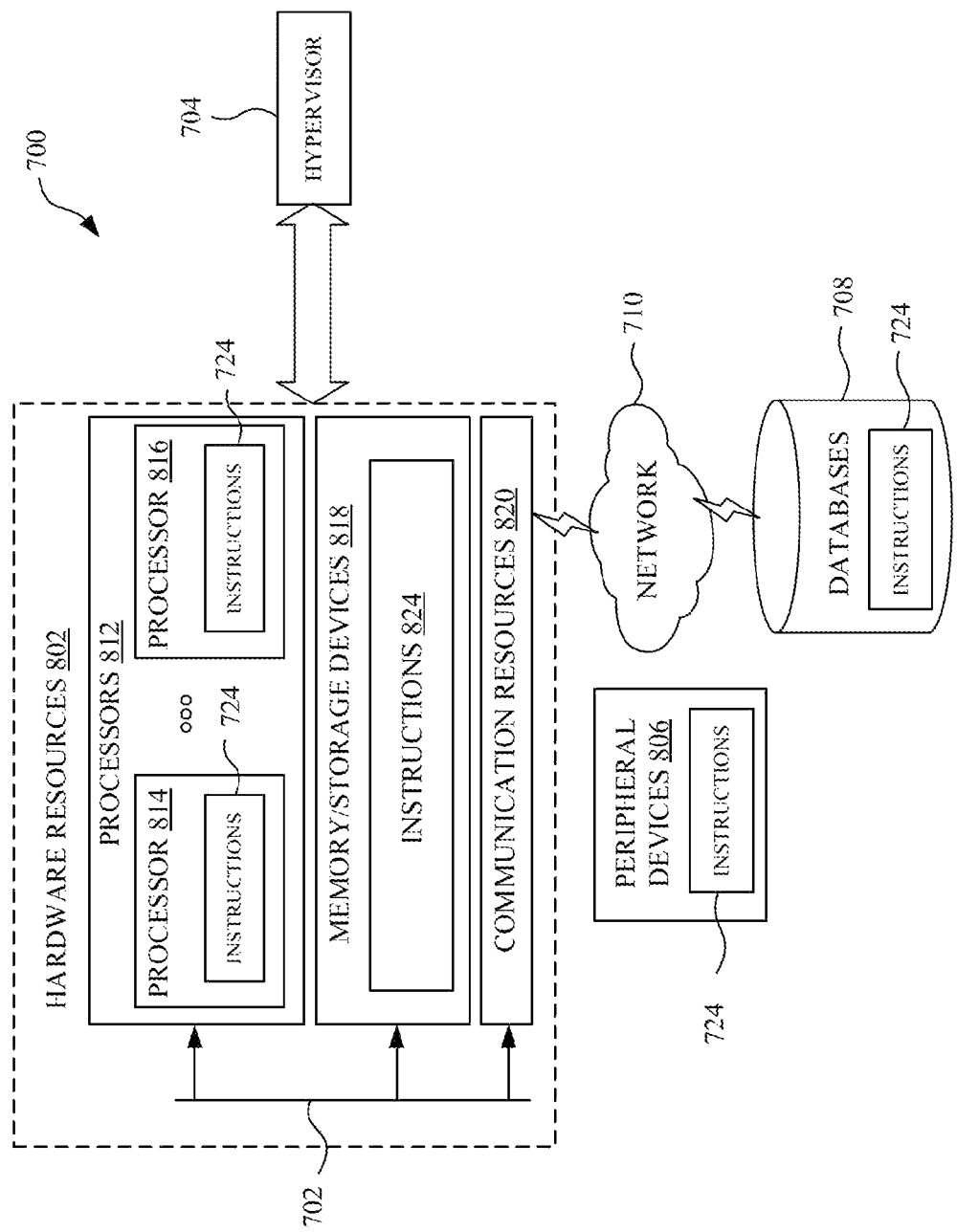
FIG. 7 illustrates components in accordance with some embodiments.

FIG. 7 is a block diagram illustrating components 700, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 702 including one or more processors 712 (or processor cores), one or more memory/storage devices 718, and one or more communication resources 720, each of which may be communicatively coupled via a bus 722. For embodiments where node virtualization (e.g., NFV) is utilized, a hypervisor 704 may be executed to provide an execution environment for one or more network slices/sub-slices to utilize the hardware resources 702.

The processors 712 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 714 and a processor 716.

The memory/storage devices 718 may include main memory, disk storage, or any suitable combination thereof. The memory/storage devices 718 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 720 may include interconnection or network interface components or other suitable devices to communicate with one or more peripheral devices 706 or one or more databases 708 via a network 710. For example, the communication resources 720 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 724 may comprise software, a program, an application, an applet, an app, or other executable code for causing at least any of the processors 712 to perform any one or more of the methodologies discussed herein. The instructions 724 may reside, completely or partially, within at least one of the processors 712 (e.g., within the processor's cache memory), the memory/storage devices 718, or any suitable combination thereof. Furthermore, any portion of the instructions 724 may be transferred to the hardware resources 702 from any combination of the peripheral devices 706 or the databases 708. Accordingly, the memory of the processors 712, the memory/storage devices 718, the peripheral devices 706, and the databases 708 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 8:
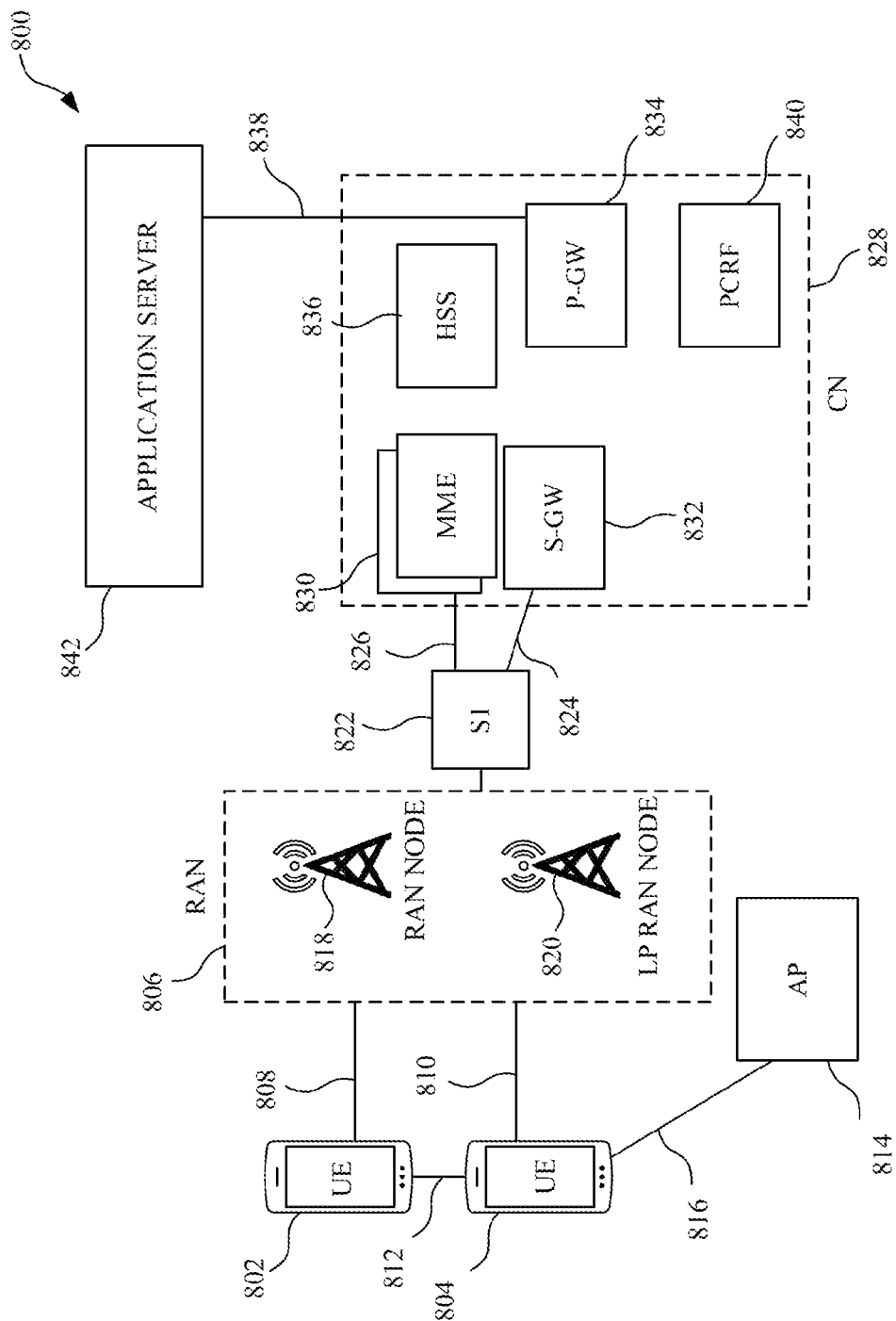
FIG. 8 illustrates an architecture of a wireless network in accordance with some embodiments.

FIG. 8 illustrates an architecture of a system 800 of a network in accordance with some embodiments. The system 800 includes one or more user equipment (UE), shown in this example as a UE 802 and a UE 804. The UE 802 and the UE 804 are illustrated as smartphones handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 802 and the UE 804 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 802 and the UE 804 may be configured to connect, e.g., communicatively couple, with a radio access network (RAN), shown as RAN 806. The RAN 806 may be, for example, an Evolved ETniversal Mobile Telecommunications System (ETMTS) Terrestrial Radio Access Network (E-UTRAN), a NextGen RAN (NG RAN), or some other type of RAN. The UE 802 and the UE 804 utilize connection 808 and connection 810, respectively, each of which comprises a physical communications interface or layer (discussed in further detail below); in this example, the connection 808 and the connection 810 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 802 and the UE 804 may further directly exchange communication data via a ProSe interface 812. The ProSe interface 812 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 804 is shown to be configured to access an access point (AP), shown as AP 814, via connection 816. The connection 816 can comprise a local wireless connection, such as a connection consistent with any IEEE 802.11 protocol, wherein the AP 814 would comprise a wireless fidelity (WiFi®) router. In this example, the AP 814 may be connected to the Internet without connecting to the core network of the wireless system (described in further detail below).

The RAN 806 can include one or more access nodes that enable the connection 808 and the connection 810. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 806 may include one or more RAN nodes for providing macrocells, e.g., macro RAN node 818, and one or more RAN nodes for providing femtocells or picocells (e.g., cells having smaller coverage areas, smaller user capacity, or higher bandwidth compared to macrocells), e.g., a low power (LP) RAN node such as LP RAN node 820.

Any of the macro RAN node 818 and the LP RAN node 820 can terminate the air interface protocol and can be the first point of contact for the UE 802 and the UE 804. In some embodiments, any of the macro RAN node 818 and the LP RAN node 820 can fulfill various logical functions for the RAN 806 including, but not limited to, radio network controller (RNC) functions such as radio bearer management, uplink and downlink dynamic radio resource management and data packet scheduling, and mobility management.

In accordance with some embodiments, the EGE 802 and the EGE 804 can be configured to communicate using Orthogonal Frequency-Division Multiplexing (OFDM) communication signals with each other or with any of the macro RAN node 818 and the LP RAN node 820 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 818 and the LP RAN node 820 to the UE 802 and the UE 804, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 802 and the UE 804. The physical downlink control channel (PDCCH) may carry information about the transport format and resource allocations related to the PDSCH channel, among other things. It may also inform the UE 802 and the UE 804 about the transport format, resource allocation, and H-ARQ (Hybrid Automatic Repeat Request) information related to the uplink shared channel. Typically, downlink scheduling (assigning control and shared channel resource blocks to the UE 804 within a cell) may be performed at any of the macro RAN node 818 and the LP RAN node 820 based on channel quality information fed back from any of the UE 802 and UE 804. The downlink resource assignment information may be sent on the PDCCH used for (e.g., assigned to) each of the UE 802 and the HE 804.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 806 is communicatively coupled to a core network (CN), shown as CN 828—via an S1 interface 822. In embodiments, the CN 828 may be an evolved packet core (EPC) network, a NextGen Packet Core (NPC) network, or some other type of CN. In this embodiment the S1 interface 822 is split into two parts: the S1-U interface 1124, which carries traffic data between the macro RAN node 818 and the LP RAN node 820 and a serving gateway (S-GW), shown as S-GW 1132, and an S1-mobility management entity (MME) interface, shown as S1-MME interface 826, which is a signaling interface between the macro RAN node 818 and LP RAN node 820 and the MME(s) 830.

In this embodiment, the CN 828 comprises the MME(s) 830, the S-GW 832, a Packet Data Network (PDN) Gateway (P-GW) (shown as P-GW 834), and a home subscriber server (HSS) (shown as HSS 836). The MME(s) 830 may be similar in function to the control plane of legacy Serving General Packet Radio Service (GPRS) Support Nodes (SGSN). The MME(s) 830 may manage mobility aspects in access such as gateway selection and tracking area list management. The HSS 836 may comprise a database for network users, including subscription-related information to support the network entities' handling of communication sessions. The CN 828 may comprise one or several HSS 836, depending on the number of mobile subscribers, on the capacity of the equipment, on the organization of the network, etc. For example, the HSS 836 can provide support for routing/roaming, authentication, authorization, naming/addressing resolution, location dependencies, etc.

The S-GW 832 may terminate the S1 interface 822 towards the RAN 806, and routes data packets between the RAN 806 and the CN 828. In addition, the S-GW 832 may be a local mobility anchor point for inter-RAN node handovers and also may provide an anchor for inter-3 GPP mobility. Other responsibilities may include lawful intercept, charging, and some policy enforcement.

The P-GW 834 may terminate an SGi interface toward a PDN. The P-GW 834 may route data packets between the CN 828 (e.g., an EPC network) and external networks such as a network including the application server 842 (alternatively referred to as application function (AF)) via an Internet Protocol (IP) interface (shown as IP communications interface 838). Generally, an application server 842 may be an element offering applications that use IP bearer resources with the core network (e.g., ETMTS Packet Services (PS) domain, LTE PS data services, etc.). In this embodiment, the P-GW 834 is shown to be communicatively coupled to an application server 842 via an IP communications interface 838. The application server 842 can also be configured to support one or more communication services (e.g., Voice-over-Internet Protocol (VoIP) sessions, PTT sessions, group communication sessions, social networking services, etc.) for the UE 802 and the UE 804 via the CN 828.

The P-GW 834 may further be a node for policy enforcement and charging data collection. A Policy and Charging Enforcement Function (PCRF) (shown as PCRF 840) is the policy and charging control element of the CN 828. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 840 may be communicatively coupled to the application server 842 via the P-GW 834. The application server 842 may signal the PCRF 840 to indicate a new service flow and select the appropriate Quality of Service (QoS) and charging parameters. The PCRF 840 may provision this rule into a Policy and Charging Enforcement Function (PCEF) (not shown) with the appropriate traffic flow template (TFT) and QoS class of identifier (QCI), which commences the QoS and charging as specified by the application server 842.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising:
- determining a first time period for the UE, based on whether the UE uses Discontinuous Reception (DRX) and whether the UE uses Measurement Gap (MG), wherein the first time period indicates a respective timing criterion for the UE to determine a time period of maintaining available downlink timing for a reference cell; and
- determining, based on the first time period, a first time threshold for the UE to determine reference cell availability.

Example 2 is the method of Example 1, wherein, when the UE does not use DRX, the first time period is determined based on a synchronization signal and physical broadcast channel block (SSB)-based measurement timing configuration (SMTC) periodicity of the UE.

Example 3 is the method of Example 2, wherein, when the UE does not use MG, the first time period is determined as a product of a first factor and the SMTC periodicity, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

Example 4 is the method of Example 3, wherein the first actor has a predefined value which is greater than or equal to 1.

Example 5 is the method of Example 3, wherein the first factor is a measurement resource sharing factor.

Example 6 is the method of Example 3, wherein the first factor is a product of a second factor and a measurement resource sharing factor, and wherein the second factor is based on how intra-frequency SMTC is overlapped with MGs.

Example 7 is the method of Example 5 or 6, wherein the measurement resource sharing factor is a carrier-specific scaling factor CSSF.

Example 8 is the method of Example 2, wherein, when the UE uses MG, the first time period is determined based on the larger one between the SMTC periodicity and a measurement gap repetition (MGRP).

Example 9 is the method of Example 8, wherein the first time threshold is determined as a product of a third factor and the larger one between the SMTC periodicity and the MGRP, the third factor having a predefined value which is greater than or equal to 1.

Example 10 is the method of Example 8, wherein the first time period is determined as a product of a fourth factor and the larger one between the SMTC periodicity and the MGRP, the fourth factor having a predefined value which is greater than or equal to 1, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

Example 11 is the method of Example 8, wherein the first time period is determined as a product of a measurement resource sharing factor and the larger one between the SMTC periodicity and the MGRP, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

Example 12 is the method of Example 11, wherein the measurement resource sharing factor is a carrier-specific scaling factor CSSF.

Example 13 is the method of Example 1, wherein, when the UE uses DRX but does not use MG, the first time period is determined based on a synchronization signal and physical broadcast channel block (SSB)-based measurement timing configuration (SMTC) periodicity and a DRX cycle of the UE.

Example 14 is the method of Example 13, wherein the first tune threshold is determined as a product of a fifth factor and the larger one between the SMTC periodicity and the DRX cycle, the fifth factor having a predefined value which is greater than or equal to 1.

Example 15 is the method of Example 13, wherein the first time period is determined as a product of a sixth factor and the larger one between the SMTC periodicity and the DRX cycle, the sixth factor having a predefined value which is greater than or equal to 1, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

Example 16 is the method of Example 13, wherein, when the DRY cycle is greater than a third time threshold, the first time period is determined as a product of the following: a measurement resource sharing factor and the DRX cycle.

Example 17 is the method of Example 16, wherein, when the DRX cycle is not greater than the third time threshold, the first time period is determined as a product of the following: a seventh factor, a measurement resource sharing factor and the larger one between the SMTC periodicity and the DRX cycle, the seventh factor being greater than or equal to 1, and
wherein the determining, based on the first time period, a first time threshold for the UE to determine reference cell availability comprises:
comparing a second time threshold for the UE to maintain local DL tithing with the first time period; and
determining the larger one between the second time threshold and the first time period as the first time threshold.

Example 18 is the method of Example 17, wherein the measurement resource sharing factor is a carrier-specific scaling factor CSSF.

Example 19 is the method of Example 13, wherein, when the DRX cycle is greater than a third time threshold, the first time threshold is determined as a product of the following: an eighth factor, a measurement resource sharing factor and the DRX cycle, wherein the eighth factor is based on how intra-frequency SMTC is overlapped with MGs.

Example 20 is the method of Example 19, wherein, when the DRX cycle is not greater than the third time threshold, the first time period is determined as a product of the following: a ninth factor, a measurement resource sharing factor, the larger one between the SMTC periodicity and the DRX cycle, and wherein the ninth factor based on how intra-frequency SMTC is overlapped with MGs, and wherein the determining, based on the first time period, a first time threshold for the UE to determine reference cell availability comprises:

comparing a second time threshold for the UE to maintain local DL timing with the first time period; and determining the larger one between the second time threshold and the first time period as the first time threshold.

Example 21 is the method of Example 19 or 20, wherein the measurement resource sharing factor is a carrier-specific scaling factor CSSF.

Example 22 is the method of Example 1, wherein, when the UE uses DRX and MG, the first time period is determined based on a synchronization signal and physical broadcast channel block (SSB)-based measurement timing configuration (SMTC) periodicity, a DRX cycle and a measurement gap repetition (MGRP) of the UE.

Example 23 is the method of Example 22, wherein the first time threshold is determined as a product of a tenth factor and the largest one among the SMTC periodicity, the DRX cycle and the MGRP, the tenth factor having a predefined value which is greater than or equal to 1.

Example 24 is the method of Example 22, wherein the first time period is determined as a product of an eleventh factor and the largest one among the SMTC periodicity, the DRX cycle and the MGRP, the eleventh factor having a predefined value which is greater than or equal to 1, and wherein the determining, based on the first time period, a first time threshold for the UE to determine reference cell availability comprises:

comparing a second time threshold for the UE to maintain local DL timing with the first time period; and determining the larger one between the second time threshold and the first time period as the first time threshold.

Example 25 is the method of Example 22, wherein, when the DRX cycle is greater than a third time threshold, the first time threshold is determined as a product of the DRX cycle and a measurement resource sharing factor.

Example 26 is the method of Example 25, wherein the measurement resource sharing factor is a carrier-specific scaling factor CSSF.

Example 27 is the method of Example 25, wherein, when the DRX cycle is not greater than the third time threshold, the first time period is determined as a product of the following: a twelfth factor, a measurement resource sharing factor, the largest one among the SMTC periodicity, the DRX cycle and the MGRP, the twelfth factor having a predefined value which is greater than or equal to 1, and wherein the determining, based on the first time period, a first time threshold for the UE to determine reference cell availability comprises:

comparing a second time threshold for the UE to maintain local DL timing with the first time period; and determining the larger one between the second time threshold and the first time period as the first time threshold.

Example 28 is the method of Example 27, wherein the measurement resource sharing factor is a carrier-specific sealing factor CSSF.

Example 29 is an apparatus for a user equipment (UE), the apparatus comprising:

one or more processors configured to perform steps of the method according to any of examples 1-28.

Example 30 is a computer readable medium having computer programs stored thereon which, when executed by one or more processors, cause an apparatus to perform steps of the method according to any of examples 1-28.

Example 31 is an apparatus for a communication device, comprising means for performing steps of the method according to any of examples 1-28.

Example 32 is a computer program product comprising computer programs which, when executed by one or more processors, cause an apparatus to perform steps of the method according to any of examples 1-28.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), comprising:
   determining a first time period for the UE, based on whether the UE uses Discontinuous Reception (DRX) and whether the UE uses Measurement Gap (MG), wherein the first time period indicates a respective timing criterion for the UE to determine a time period of maintaining available downlink timing for a reference cell; and determining, based on the first time period, a first time threshold for the UE to determine reference cell availability.

2. The method of claim 1, wherein, when the UE does not use DRX, the first time period is determined based on a synchronization signal and physical broadcast channel block (SSB)-based measurement timing configuration (SMTC) periodicity of the UE.

3. The method of claim 2, wherein, when the UE does not use MG, the first time period is determined as a product of a first factor and the SMTC periodicity, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

4. The method of claim 3, wherein the first factor has a predefined value which is greater than or equal to 1.

5. The method of claim 3, wherein the first factor is a measurement resource sharing factor.

6. The method of claim 3, wherein the first factor is a product of a second factor and a measurement resource sharing factor, and wherein the second factor is based on how intra-frequency SMTC is overlapped with MGs.

7. The method of claim 6, wherein the measurement resource sharing factor is a carrier-specific scaling factor CSSF.

8. The method of claim 2, wherein, when the UE uses MG, the first time period is determined based on the larger one between the SMTC periodicity and a measurement gap repetition (MGRP).

9. The method of claim 8, wherein the first time threshold is determined as a product of a third factor and the larger one between the SMTC periodicity and the MGRP, the third factor having a predefined value which is greater than or equal to 1.

10. The method of claim 8, wherein the first time period is determined as a product of a fourth factor and the larger one between the SMTC periodicity and the MGRP, the fourth factor having a predefined value which is greater than or equal to 1, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

11. The method of claim 8, wherein the first time period is determined as a product of a measurement resource sharing factor and the larger one between the SMTC periodicity and the MGRP, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

12. The method of claim 11, wherein the measurement resource sharing factor is a carrier-specific scaling factor CSSF.

13. The method of claim 1, wherein, when the UE uses DRX but does not use MG, the first time period is determined based on a synchronization signal and physical broadcast channel block (SSB)-based measurement timing configuration (SMTC) periodicity and a DRX cycle of the UE.

14. The method of claim 13, wherein the first time threshold is determined as a product of a fifth factor and the larger one between the SMTC periodicity and the DRX cycle, the fifth factor having a predefined value which is greater than or equal to 1.

15. The method of claim 13, wherein the first time period is determined as a product of a sixth factor and the larger one between the SMTC periodicity and the DRX cycle, the sixth factor having a predefined value which is greater than or equal to 1, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

16. The method of claim 13, wherein, when the DRX cycle is greater than a third time threshold, the first time period is determined as a product of the following: a measurement resource sharing factor and the DRX cycle.

17. The method of claim 16, wherein, when the DRX cycle is not greater than the third time threshold, the first time period is determined as a product of the following: a seventh factor, the measurement resource sharing factor and the larger one between the SMTC periodicity and the DRX cycle, the seventh factor being greater than or equal to 1, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

18. The method of claim 16, wherein the measurement resource sharing factor is a carrier-specific scaling factor CSSF.

19. The method of claim 13, wherein, when the DRX cycle is greater than a third time threshold, the first time threshold is determined as a product of the following: an eighth factor, a measurement resource sharing factor and the DRX cycle, wherein the eighth factor is based on how intra-frequency SMTC is overlapped with MGs.

20. The method of claim 19, wherein, when the DRX cycle is not greater than the third time threshold, the first time period is determined as a product of the following: a ninth factor, a measurement resource sharing factor, the larger one between the SMTC periodicity and the DRX cycle, and wherein the ninth factor based on how intra-frequency SMTC is overlapped with MGs, and
wherein the determining, based on the first time period, a first time threshold for the UE to determine reference cell availability comprises:
comparing a second time threshold for the UE to maintain local DL timing with the first time period; and
determining the larger one between the second time threshold and the first time period as the first time threshold.

* * * * *